United States Patent [19]

Morimoto

[11] Patent Number: 5,343,237
[45] Date of Patent: Aug. 30, 1994

[54] SYSTEM FOR DETECTING AND WARNING AN ILLEGALLY PARKED VEHICLE

[75] Inventor: Kazuo Morimoto, Yokohama, Japan

[73] Assignee: Matsushita Electric Industrial Co., Ltd., Osaka, Japan

[21] Appl. No.: 769,380

[22] Filed: Oct. 1, 1991

[30] Foreign Application Priority Data

Oct. 8, 1990 [JP] Japan .................. 2-270837

[51] Int. Cl.$^5$ ............................................. H04N 7/18
[52] U.S. Cl. ..................... 348/143; 340/932.2
[58] Field of Search .............. 358/93, 108, 229; 340/937, 932.2; 348/700, 143, 152, 155; 382/48, 30; H04N 7/18

[56] References Cited

U.S. PATENT DOCUMENTS 3,858,223 12/1974 Holzapfel ................. 340/937

FOREIGN PATENT DOCUMENTS

| 0002494 | 1/1990 | Japan | 340/932.3 |
| 0148297 | 6/1990 | Japan | 340/932.2 |
| 0067400 | 3/1991 | Japan | 340/932.2 |
| 0161898 | 7/1991 | Japan | 340/932.2 |
| 0166698 | 7/1991 | Japan | 340/937 |

Primary Examiner—Richard Hjerpe
Assistant Examiner—Min Sun Oh
Attorney, Agent, or Firm—Stevens, Davis, Miller & Mosher

[57] ABSTRACT

In a system for detecting and warning an illegally parked vehicle a television (TV) camera images a prescribed roadside zone where parking is prohibited at a prescribed time interval. A produced still TV image is stored, and a TV image of a prescribed pattern painted on the roadside without any vehicle is stored as a reference image. The still image is compared with the reference image thereby to produce an image which carries information indicative of the presence of a vehicle in the zone and the vehicle presence information image is stored. The move-off of the vehicle is detected by comparing images of the vehicle presence information storage at a prescribed time interval. The vehicle is warned of illegal parking upon detecting that the vehicle does not move off before expiration of a prescribed time.

4 Claims, 2 Drawing Sheets

```
WARNING OF ILLEGAL PARKING

THE FOLLOWING ILLEGALLY PARKED VEHICLES MUST BE
MOVED OFF IMMEDIATELY. THE VEHICLES WILL BE
MOVED BY FORCE OF WRECKER IN 20 MINUTES.

SHINAGAWA   55  a   42 - 49

YOKOHAMA    88  b   12 - 34

NAGOYA      77  c   77 - 77
```

SYSTEM FOR DETECTING AND WARNING AN ILLEGALLY PARKED VEHICLE

BACKGROUND OF THE INVENTION

This invention relates to a system for detecting and warning an illegally parked vehicle operative to display a warning automatically on the spot against a vehicle which is parked illegally at a roadside near a busy crossing, at the top of a slope where visibility is poor, or at a gate of an emergency vehicle station such as a fire engine station, and to transmit an image to the control center so that the center controls a camera to recognize the license number of the illegally parked vehicle or displays or calls a warning for possible forced removal or arrest, with the intention of maintaining the traffic security and preventing the traffic congestion.

Recent increases in the illegal parking of vehicles, as a result of increased number of vehicles, is becoming a social problem. A typical conventional manner of dealing with illegally parked vehicles is that a policeman who finds an illegally parked vehicle makes a mark of the vehicle's wheel position on the road and, if the vehicle does not seem to move off after expiration of a prescribed time at the next watching, decides that the vehicle is illegally parked.

Although automation of illegal parking detection is studied, it is not practical to install sensors underground or overhead in a huge number of spaces where illegal parking of vehicles is expected. A method of image processing by installing TV cameras has a problem of accuracy and it is not practical. On this account, the prevention and detection of illegally parked vehicles are still rely on manpower, even in severe weather conditions.

SUMMARY OF THE INVENTION

This invention is intended to solve the foregoing problem, and its prime object is to provide a system capable of detecting and warning an illegally parked vehicle automatically, and recognizing the license number of the vehicle at the control center so as to display or call the license number on a display device or loud speaker thereby to prompt the move-off of the vehicle, or ultimately dispatch a personel to the site for acting the arrest or forced movement.

In order to achieve the above objective, the invention is characterized as follows.

(1) The illegally parked vehicle detecting and warning system comprises a television (TV) camera for imaging a prescribed roadside zone where parking is prohibited at a prescribed time interval, means for storing a produced still TV image, means for storing a TV image of a pattern painted on the roadside without any vehicle as a reference image, means for comparing a still image with the reference image thereby to produce an image which carries information indicative of the presence of a vehicle in the zone and storing the vehicle presence information image, means for detecting the move-off of the vehicle by comparing images of the vehicle presence information storage means at a prescribed time interval, means for warning the illegally parked vehicle upon detecting that the vehicle does not move-off before expiration of a prescribed time, and means for transmitting information of the affair to an external control center. The vehicle presence information is revealed from the shape and position of a pattern image portion which is hidden by the image of vehicle.

(2) The system further includes means for detecting the vehicle's license number so that it is read visually by the operator through the TV camera or recognized with a character recognition device.

(3) The system further includes means of compressing the signal transmission band so that a band-compressed image signal is transmitted to the external control center.

In operation, the reference image storage means stores a pattern image of the roadside, the vehicle presence information storage means detects and stores the position and shape of an illegally parked vehicle based on the change in the pattern image, the vehicle move-off detection means compares vehicle presence information at a prescribed time interval, the warning means emits a warning to the vehicle if it does not move-off within the prescribed time duration, and the transmission means transfers information on the illegally parked vehicle to the control center. The license number recognition means provides the operator with the license number of the vehicle through the TV camera or the character recognition device. The signal band compression means implements band compression for the image signal thereby to enhance the efficiency of transmission path.

DESCRIPTION OF THE PREFERRED EMBODIMENT

The illegally parked vehicle detecting and warning system based on this invention will be described with reference to the drawings.

Figure 1:
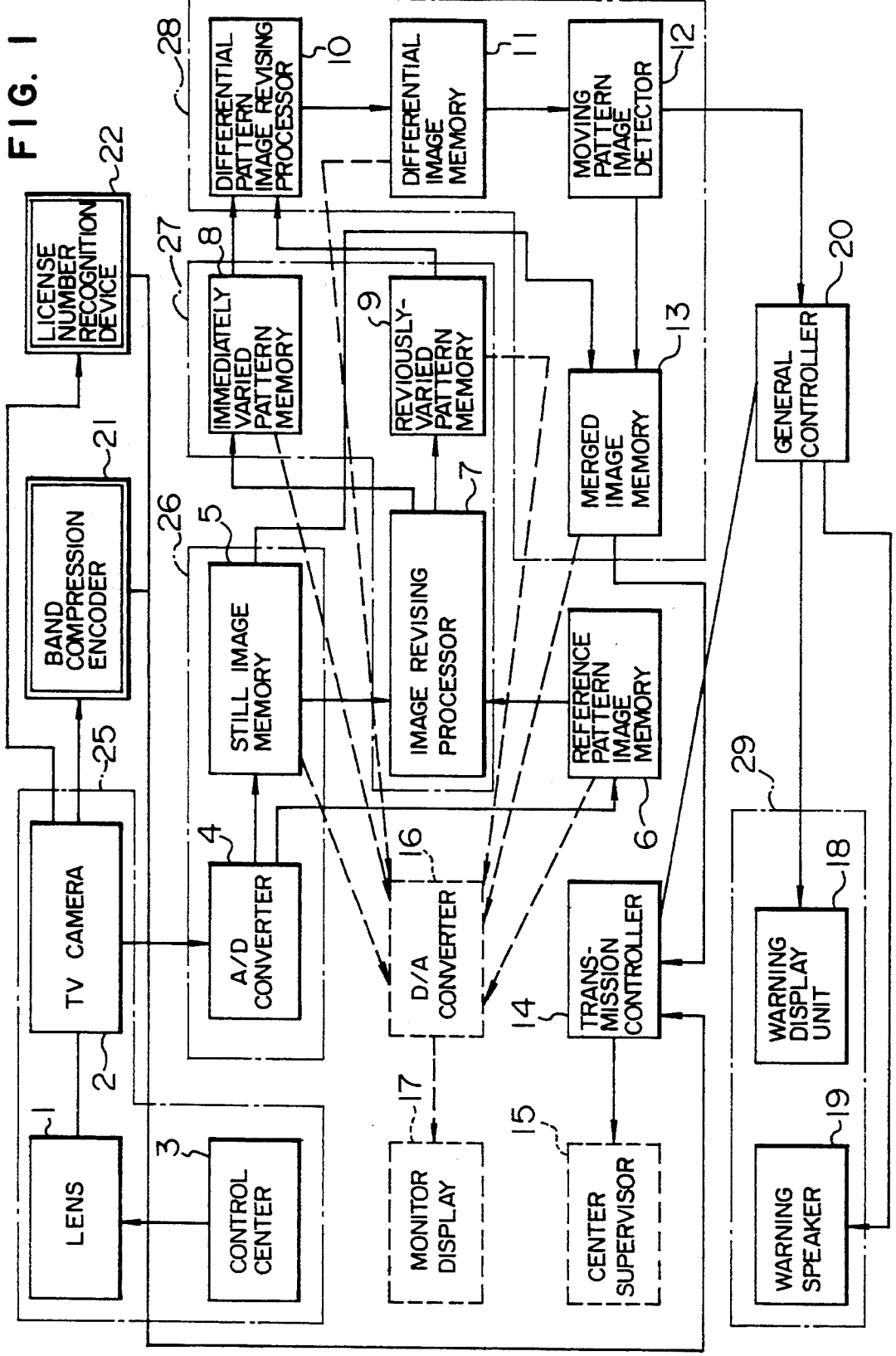
FIG. 1 is a block diagram showing the arrangement of the illegally parked vehicle detecting and warning system based on an embodiment of this invention.

FIG. 1 is a block diagram showing the arrangement of the illegally parked vehicle detecting and warning system based on an embodiment of this invention. In the figure, indicated by 1 is an optical lens provided for a TV camera 2, 3 is a camera controller which controls the sight (up/down/right/left) of the camera and the zoom, aperture stop and focus of the lens, 4 is an A/D converter for converting the image signal from the TV camera into digital data, 5 is a still image memory for storing the image data of a still image, 6 is a reference pattern image memory which stores an image of roadside taken in the absence of vehicles, 7 is an image revising processor which detects the difference between image retrieved from the still image memory 5 and reference pattern image memory 6 by masking off roadside areas other than the no-parking zone, 8 is an immediately-varied pattern image memory for storing the varied pattern image detected immediately by the processor 7, and 9 is a previously-varied pattern image memory for storing the varied pattern image detected previously by the processor 7.

10 is a differential pattern image revising processor which detects an image portion which has changed from the previous image, 11 is a differential image memory for storing the result of difference detection, 12 is a moving pattern image detector for detecting the move-off of a parked vehicle based on the contents of the memory 11, 13 is a merged image memory which marks a portion of the illegally parked vehicle detected by the move-off detector 12 on the immediate image retrieved from the still image memory 5, and 14 is a transmission controller which sends the images of the still image memory 5, merged image memory 13 and band-compression encoder 21 to a center supervisor 15.

16 is a D/A converter used for the operation test, and 17 is a monitor display used to observe images in the memories 5, 6, 8, 9, 11 and 13.

Figures 2, 3:
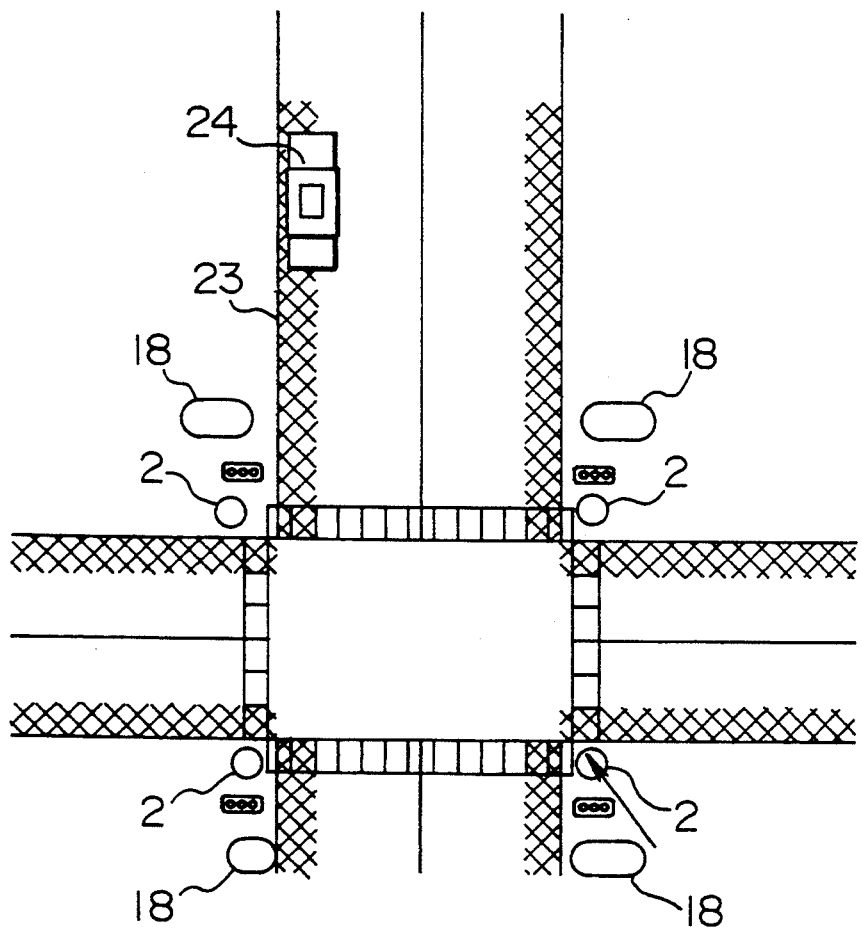
FIG. 2 is a diagram showing, as an example, the roadsides patterns and the disposition of TV cameras based on the inventive system, and an illegally parked vehicle.
FIG. 3 is a diagram showing, as an example, a displayed warning produced by the inventive system.

18 is a warning display unit which displays a warning in a variable combination of characters on detecting an illegally parked vehicle, with an example of display being shown in FIG. 3, 19 is a warning speaker with a voice synthesizing function for calling a voiced warning, and 20 is a general controller for controlling the overall operation.

21 is a band-compression encoder which functions to reduce the volume of transmission data, and 22 is an automatic license number recognizing device which reveals the license number of a parked vehicle.

FIG. 2 is a plan view showing the crossing of roads where the inventive illegally parked vehicle detecting and warning system is installed. Indicated by 23 are cross-hatch patterns painted on the roadsides indicative of no-parking zones, and 24 is an illegally parked vehicle.

The operation of the system arranged as described above will be explained.

When a vehicle 24 is parked at the position shown in the figure, the pattern 23 is partly hidden by the vehicle 24 in the image produced by the TV camera 2. The hidden portion which is detected immediately is stored in the immediately-varied pattern memory 8. The painted pattern on the roadside is designed to be mosaic in black and white distinct from the paint of vehicles so that the shape of every vehicle can be recognized.

It is possible to distinguish an illegally parked vehicle from a vehicle which stops due to traffic congestion based on the duration of stop, the distance of the vehicle from the edge of the road, and the order of parking vehicles. A new movement is detected through comparison by the previously-varied pattern memory 9 and processor 10, and it is stored in the differential pattern image memory 11. The moving pattern image detector 12 detects the position of image variation resulting from the new movement as the address of the frame of image, and it is transferred to the general controller 20. Unless the vehicle 24 moves off within a certain period, a varied pattern image is not stored in the differential pattern image memory 11, and the moving pattern image detector 12 determines the vehicle to remain parking. If this state lasts for a prescribed time length, the warning devices 18 and 19 are activated. The license number of the vehicle is not yet known, and the content of warning will be "Illegally parked vehicle at place . . . . . must be moved off immediately!".

If move-off of the vehicle 24 is not detected on expiration of another prescribed time, the image in the still image memory 5, with the vehicle's position being marked in it, is transmitted to the control center. The control center operates on the camera controller 3 by making reference to the received image to remote-control the TV camera 2 for its sight, zoom and focus in steps so that the license number of the illegally parked vehicle is visible.

In case the reduction of transmission volume is a prime demand, the image is transmitted by being band-compressed by the band compression encoder 21. The band compression means is based on the run-length encoding, or photographic or mosaic figure processing. Although the band compressed image transmission may degrade the picture quality on the monitor screen, it improves the efficiency of transmission line. The recognized license number is recorded in the control center. Image transmission without band compression provides a clear still image, and it is filed in the control center and used for arrest.

After the license number has been read automatically or visually, the control center issues a command to the camera controller so that the TV camera is relieved of zooming and restored to the initial sight based on the memorized control parameters. Fine adjustment of the TV camera lens is implemented automatically by using a special roadside pattern which is not hidden by vehicles. After that, the system operation returns to the process of detecting an illegally parked vehicle.

An alternative system arrangement is to equip the TV camera unit with an automatic license number reader so that it recognizes all characters on the license number plate. The inventive system aims at parked vehicles and operates with a relatively long imaging interval. Therefore, the system does not need fast processing, and a compact microcomputer-based system configuration suffices the purpose.

In case a plurality of TV cameras are installed as in the example of FIG. 2, the central processor includes the memories 5, 6, 8, 9, 11 and 13 shown in FIG. 1 each equal in number to the number of TV cameras, and the system operates by switching the TV cameras and associated memories.

The pattern of no-parking zone may be painted on the guardrail or sidewalk instead of the roadside for the convenience of the TV camera position. An existing pattern may be used provided that it is distinct from vehicles. Painting a pattern on the guardrail is advantageous against snowfall and road construction work.

The illegally parked vehicle detecting and warning system based on the foregoing embodiment comprises a television (TV) camera for imaging a prescribed roadside zone where parking is prohibited at a prescribed time interval, means for storing a produced still TV image, means for storing a TV image of a pattern painted on the roadside without any vehicle as a reference image, means for comparing a still image with the reference image thereby to produce an image which carries information indicative of the presence of a vehicle in the zone and storing the vehicle presence information image, means for detecting the move-off of the vehicle by comparing images of the vehicle presence information storage means at a prescribed time interval, means for warning the vehicle of illegal parking upon detecting that the vehicle does not move off before expiration of a prescribed time, and means for transmitting information of the affair to an external control center. The vehicle presence information is revealed from the shape and position of a pattern image portion which is hidden by the image of vehicle. The system further includes means of recognizing the vehicle's license number, which operates such that the license number of a vehicle which has been parked in excess of a prescribed time length is read visually by the operator through the TV camera or recognized with a character recognition device, and means of compressing the signal transmission band so that a band-compressed image signal is transferred to the external control center. The distinct painted pattern on the roadside, which is more noticeable than the usual roadside mark of no-parking zone, the significant effect of retarding the illegal parking. Because of the vehicle detection based on the image processing using special pattern, it is more simple in process and more accurate in detection as compared with the process which deals with vehicles themselves in diverse colors and shapes.

In addition to the automatic issuance of a warning which includes information on the parking position, a long-term illegally parked vehicle has its license number detected by the control center through the remote control of the TV camera, and it is effective to prompt the move-off of the vehicle and prevent illegal parking.

The camera controller memorizes the control parameters sent from the control center, and following the transfer of license number it controls the TV camera to restore the initial sight in response to a simple command transmission from the control center.

It will be appreciated from the foregoing embodiment that the inventive system comprises a television (TV) camera for imaging a prescribed roadside zone where parking is prohibited at a prescribed time interval, means for storing a produced still TV image, means for storing a TV image of a pattern painted on the roadside without any vehicle as a reference image, means for comparing a still image with the reference image thereby to produce an image which carries information indicative of the presence of a vehicle in the zone and storing the vehicle presence information image, means for detecting the move-off of the vehicle by comparing images of the vehicle presence information storage means at a prescribed time interval, means for warning the vehicle of illegal parking upon detecting that the vehicle does not move off before expiration of a prescribed time, and means for transmitting information of the affair to an external control center. The vehicle presence information is revealed from the shape and position of a pattern image portion which is hidden by the image of vehicle. The system further includes means for recognizing the vehicle's license number, which operates such that the license number of a vehicle which has been parked in excess of a prescribed time length is read visually by the operator through the TV camera or recognized with a character recognition device, and means for compressing the signal transmission band so that a band-compressed image signal is supplied to the transmission means. The system enables automatic detection and warning of illegally parked vehicles without the need of manpower, and revelation of the license numbers of long-term illegally parked vehicles, based on which such a further step of action as forced removal of vehicles can be implemented.

I claim:

1. A system for detecting and warning an illegally parked vehicle, comprising:
   a television (TV) camera for imaging a prescribed roadside zone where parking is prohibited at a prescribed time interval and producing a still TV image;
   means for storing said produced still TV image;
   means for storing a TV image of a prescribed pattern painted on said roadside zone without any vehicle present, as a reference image;
   means for comparing said still TV image with said reference so as to periodically produce vehicle presence images indicative of a presence of a vehicle in said roadside zone based upon a shape and position of a portion of said prescribed pattern which is hidden by said vehicle and storing said vehicle presence information image;
   means for detecting a move-off of said vehicle by comparing said vehicle presence images at a prescribed time interval;
   means for warning said vehicle upon detecting that the vehicle has not moved off before expiration of a prescribed time; and means for transmitting information of said vehicle to an external control center.

2. An illegally parked vehicle detecting and warning system according to claim 1, further comprising means for recognizing a license number of said vehicle operating such that the license number of a vehicle which has been parked in excess of a prescribed time length is read visually by an operator or recognized with a character recognition device.

3. An illegally parked vehicle detecting and warning system according to claim 1, further comprising means for compressing a signal transmission band, said means implementing the band compression for the TV image signal and supplying a band-compressed signal to said transmission means.

4. A method for detecting and warning an illegally parked vehicle, comprising the steps of: storing a pattern which is painted on a roadside; detecting and storing a vehicle presence information of a position and shape of an illegally parked vehicle based on a change in the pattern caused by parking of the vehicle;
   detecting move-off of a vehicle based on a time-based comparison of the vehicle presence information; emitting a warning to said vehicle if it has not been moved off before expiration of a prescribed time; and
   transmitting information on the illegally parked vehicle to a control center.

* * * * *